May 31, 1966  F. J. MADISON  3,253,416
MATERIAL HANDLING CONVEYER
Filed Oct. 25, 1962
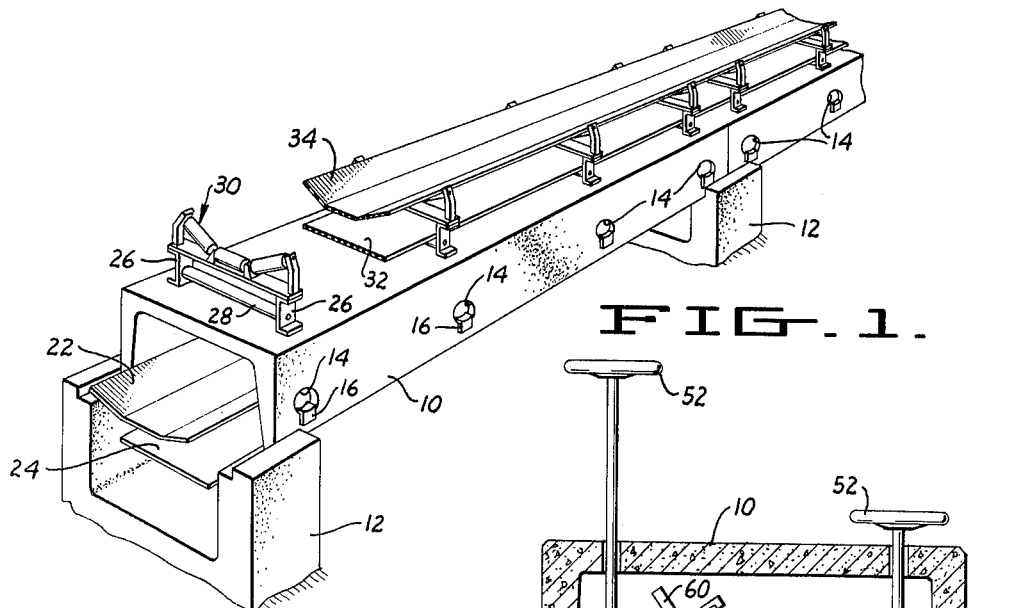
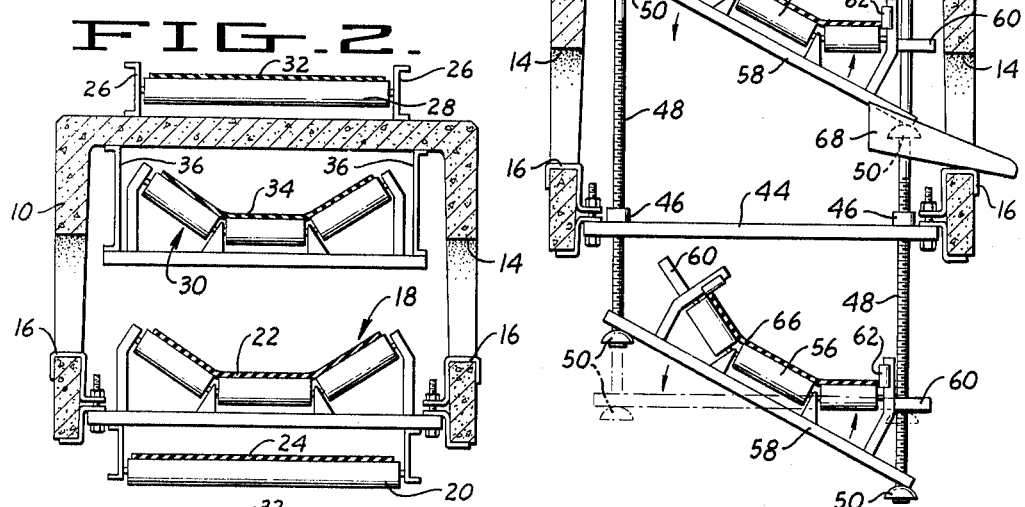
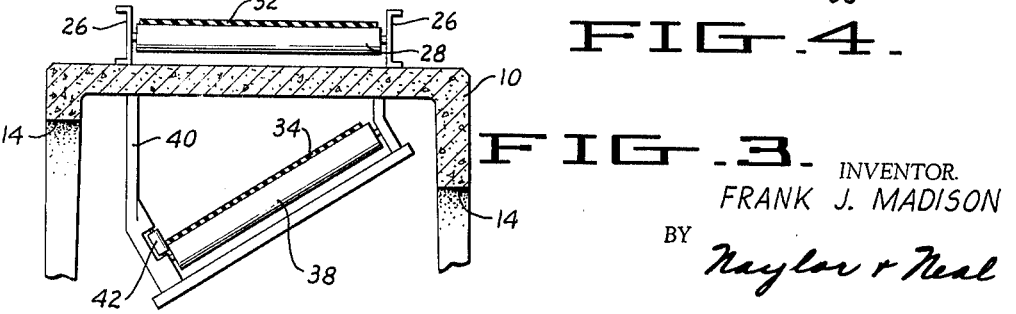
INVENTOR.
FRANK J. MADISON
BY
Naylor + Neal
ATTORNEYS United States Patent Office
3,253,416
Patented May 31, 1966

3,253,416
MATERIAL HANDLING CONVEYER
Frank J. Madison, Road 1, Box 285, Trafford, Pa.
Filed Oct. 25, 1962, Ser. No. 233,114
1 Claim. (Cl. 61—30)

This invention relates to material handling apparatus and more particularly to belt conveyers designed for carrying large quantities of material over the ground.

In my earlier invention, filing date June 3, 1960 and Serial Number 33,727, now Patent No. 3,065,843, of which this application is a continuation in part, I have disclosed a conveyer for transporting large quantities of materials, and particularly minerals, over the ground. The conveyer is made of a plurality of reinforced concrete trusses which are supported above the ground on piers with the trusses having the general shape of an inverted U and enclosing upper and lower idler assemblies which carry an endless conveyer belt. This conveyer is very efficient in transporting large volumes of material, but some situations have been found where it is desirable to provide even greater material handling capacity and different types of conveyer operation which are not obtained easily with the apparatus of my earlier invention.

Thus, one of the applications in which substantial advantages can be obtained with the conveyers of my earlier invention is the construction of large earth fill dams where large quantities of earth must be moved to the site of the dam. In these and other applications, however, it is often desirable to provide more than one conveyer for a single job in order that the conveyer can carry to the site streams of different materials, such as, soil and rock, and in order that the conveyer may be operated to deliver materials to different locations at the same time.

In accordance with the present invention, the reinforced concrete truss structure of my earlier invention is employed for supporting two conveyers superimposed upon each other. The lower of the two conveyers is supported on idler roller assemblies which are suspended on removable brackets which hang in idler roller inspection ports in the truss side walls in accordance with my earlier invention, and the upper conveyer is supported on idler roller assemblies which are attached to the truss directly above idler assemblies of the lower conveyer.

The upper conveyer may be supported on top of the truss, and one or both of its belt courses may be supported below the top of the truss and inside the inverted U-shape of the truss. In one very advantageous form of this invention, the upper conveyer has upper and lower courses where only the lower course is supported within the truss with the lower course being supported in troughed or dished condition for carrying the material conveyed by the conveyer. Here the material to be conveyed is delivered to the space between the two conveyer courses adjacent to one end of the conveyer, and one edge of the conveyer belt of this lower course is tipped downwardly adjacent to the other end of the conveyer to discharge material therefrom laterally of the conveyer.

The idler roller structure employed for supporting the lower belt course in this discharge position is used advantageously along the entire length of the conveyer since it permits the conveyer to be adjusted to discharge material laterally at different areas along the length of the conveyer. When the conveyer is made adjustable in this manner, it is particularly useful in applications such as the building of earth filled dams since the conveyer can be constructed along the line of the proposed dam and at the proposed level of the top of the dam; the earth for the dam can then be conveyed to all points along the length of the dam by periodically adjusting the conveyer discharge idlers while the dam is built up around the conveyer piers leaving the piers in the dam as reinforcing dead men.

In the course of using my conveyers for building a dam or the like in this manner, the conveyor truss structure can support two independent endless conveyers, as where it may be desirable to deliver all conveyable material to the conveyer at one end of the conveyer. On the other hand, where it may be convenient to deliver material to the conveyer at both ends thereof, the upper and lower courses of a single endless belt conveyer may be used to provide two conveyer belt surfaces for the two streams of conveyed material moving in opposite directions and with the support idlers of both courses being adjustable to discharge material laterally of the conveyer at selected points along the length thereof.

Other objects and advantages of the present invention will become apparent from the following description read in conjunction with the attached drawing in which:

FIG. 1 is a perspective view of one form of apparatus constructed in accordance with this invention;

FIG. 2 is a cross sectional view of an alternative form of apparatus of the invention;

FIG. 3 is another view of the apparatus of FIG. 2 showing the discharge station for the upper conveyer, and FIG. 4 is a cross sectional view of another form of apparatus of this invention.

Referring now in detail to the drawings and particularly to FIG. 1, a conveyer structure is illustrated therein which incorporates the structure of my said earlier invention where reinforced concrete trusses 10 of generally inverted U-shape are supported on piers 12 and have a plurality of longitudinally spaced idler inspection ports 14 through which brackets 16 extend with the brackets 16 carrying idler roller assemblies as indicated in FIG. 2 where the idler roller assembly has an upper set of troughing rollers 18 and a lower return roller 20 for supporting material conveying and return courses 22 and 24 respectively of an endless conveyer belt.

In the form of apparatus shown in FIG. 1, the second conveyor is mounted directly on top of the truss 10 by means of idler assemblies in which brackets 26 are mounted directly on the truss 10 and carry a lower idler roller 28, and an upper troughing roller assembly 30 is mounted on the brackets 26 with the idler rollers 28 and 30 supporting the return and material conveying courses 32 and 34 respectively of a second endless conveyor belt. In this form of apparatus, the two conveyors may be employed for conveying two material streams in the same direction and discharging the streams at the same point at one end of the truss structure, and where it is desirable to discharge the conveyed material at points intermediate of the ends of the two conveyers, either or both of the conveyers may be modified at points intermediate of their ends for lateral discharge as indicated in the other forms of apparatus of this invention.

In the form of apparatus illustrated in FIGS. 2 and 3, the two conveyers are again adapted primarily to convey two streams of material in the same direction and discharge them at one end of the truss structure. In this form of apparatus, however, one course of the upper conveyer is positioned outside of the truss 10 and the other course is positioned inside the truss with the course which is inside the truss being protected from the weather. Thus, the brackets 26 and return idlers 28 are mounted on top of the truss 10 supporting the return course 32 of the upper conveyer belt, and the troughing idlers 30 are mounted inside of the truss 10 by brackets 36 and support the lower course 34 of the upper conveyer belt in dished condition for conveying material thereon. The idler assemblies 30 are mounted directly above the idler assemblies 18 so that both of the sets of idlers may be inspected through one of the idler inspection ports 14. As indicated in FIG. 3, material on the conveyer course 34 is discharged laterally of the conveyer by supporting the conveyer course 34 in inclined position on an inclined idler roller 38. The roller 38 is supported on an inclined bracket assembly 40 which preferably includes a small auxiliary idler 42 positioned to engage the edge of the belt course 34 thereby providing antifriction support for the belt laterally of the roller 38.

The form of apparatus illustrated in FIG. 4 is particularly useful for conveying material from the two ends of the conveyer to intermediate points along the length of the conveyer where the material may be discharged laterally from the conveyer as where the conveyer is employed as mentioned above in the building of earth fill dams and the like. In this apparatus, a support arm 44 is mounted at its opposite ends on two of the brackets 16 which are hung in the idler inspection ports 14 in the truss 10. The arm 44 carries a pair of threaded bosses 46 through which vertical threaded shafts 48 pass, and the shafts 48 carry upper and lower frusto-spherical flanges 50 and manipulating hand wheels 52. Upper and lower troughing idler roller assemblies 54 and 56 respectively are mounted on arms 58, and the arms 58 have slots in their opposite ends through which the shafts 48 pass with the arms being supported on the frusto-spherical flanges 50, to support the idler roller assemblies 54 and 56 on the arm 44. The idler roller assemblies also carry upper brackets 60 which engage the shaft 48 to prevent tipping of the idler roller assemblies, and the idler roller assemblies also carry lateral guide rollers 62 similar to the guide roller 42 illustrated in FIG. 3. The upper and lower courses 64 and 66 respectively of a single endless belt are supported on the idler roller assemblies 54 and 56 respectively with both courses of the belt supported in dished condition for conveying material thereon. Suitable means (not shown) are provided at opposite ends of the truss structure 10 for delivering conveyable material to the two courses 64 and 66 of the belt, and the hand wheels 52 may be manipulated at any selected intermediate position along the length of the conveyer to provide discharge of material from both courses of the belt at that position. Thus, the hand wheels 52 may be manipulated to raise the left hand threaded shaft 48 and lower the right hand shaft 48 to thereby tip the right hand edges of the two courses of the belt to positions below the positions of the center portions of the courses to thereby discharge material to the right hand side of the two courses. To facilitate this discharge, a plurality of baffles 68 may be mounted along the length of the conveyer in the inspection ports 14 to intercept the material discharged from the upper conveyer course 64 and direct it through the inspection port. It should be noted that the form of apparatus illustrated in FIG. 4 is particularly useful in the type of dam construction project described above where the conveyer truss structure 10 is mounted above the ground at the intended level of the top of the dam, and the materials for dam construction are conveyed to all points along the dam by the two courses of the conveyer from positions adjacent to the two ends of the truss structure. The hand wheels 52 along the length of the truss structure may be adjusted periodically to deliver material to different points along the length of the conveyer while the material thus discharged is moved and packed along the length of the conveyer by suitable earth moving equipment with the piers 12 on which the conveyer is mounted being embedded in the earth fill dam as reinforcing dead men. When it is desirable to deliver material to a plurality of points along the length of the truss 10 simultaneously, the hand wheels 52 may be manipulated to provide two points of material discharge so that material on the two conveyer courses will discharge at the discharge points close to the supply ends of the two courses. Additionally, the adjustable discharge arrangement shown in FIG. 4 permits the two conveyers to be tipped sufficiently to discharge only a portion of their contents at one point while additional material is conveyed along the conveyer to be discharged at another point.

While certain specific embodiments of this invention have been illustrated and described in detail herein, it is obvious that many modifications thereof may be made without departing from the spirit and scope of the invention.

I claim:

The method of building an earth fill structure which comprises erecting a plurality of piers along the length of the structure to be built and of a height at least as great as the height of the structure to be built, mounting a lateral discharge endless belt conveyer on top of said piers extending along the length of the structure to be built, placing on said conveyer at at least one end thereof the earth material from which said structure is to be built, periodically adjusting said conveyer to discharge said material laterally from said belt at different points along the length thereof, and forming said structure from the material discharged from said conveyer while burying said piers in said structure.

References Cited by the Examiner

UNITED STATES PATENTS

| | | | |
|---|---|---|---|
| 704,181 | 7/1902 | Foote | 61—30 |
| 1,156,385 | 10/1915 | Willson | 198—187 |
| 1,328,099 | 1/1920 | Parkes | 198—159 |
| 1,980,634 | 11/1934 | Phillips | 61—30 |
| 2,168,622 | 8/1939 | Levin | 198—204 |
| 2,263,506 | 11/1941 | Lane | 198—139 |
| 2,523,829 | 9/1950 | Hubbell | 198—204 |
| 2,935,424 | 5/1960 | Glaus | 198—187 |
| 3,065,843 | 11/1962 | Madison | 198—204 |

FOREIGN PATENTS

| | | |
|---|---|---|
| 557,659 | 5/1958 | Canada. |
| 340,620 | 9/1921 | Germany. |
| 1,121,539 | 1/1962 | Germany. |

SAMUEL F. COLEMAN, *Primary Examiner.*

WILLIAM B. LABORDE, *Examiner.*

R. E. AEGERTER, *Assistant Examiner.*